2,779,197
Patented Jan. 29, 1957

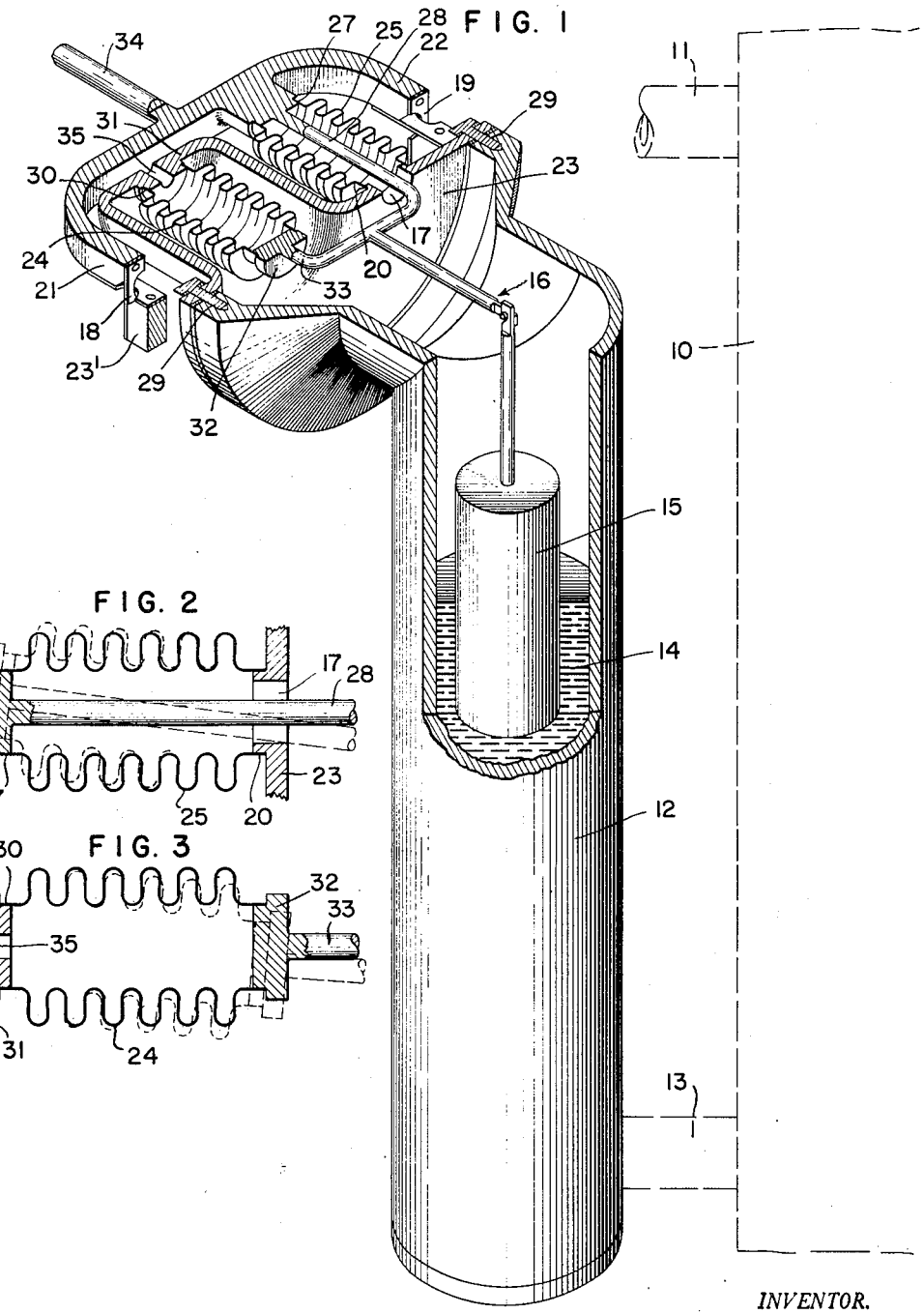

2,779,197
PRESSURE COMPENSATED SEAL

John M. Embree, Farmington, Conn., assignor to Minneapolis-Honeywell Regulator Company, Minneapolis, Minn., a corporation of Delaware Application January 25, 1954, Serial No. 405,974

10 Claims. (Cl. 74—18.1)

The general object of the present invention is to provide a pressure compensated seal in a wall of a pressure chamber which will not deter the transmission of mechanical motion through said wall during changes of pressure within the chamber. More specifically the present invention is devised and well suited for apparatus in which a transmitting rod is required to transmit an arcuate motion through a sealed wall to an indicator, transmitter, or any suitable utilization means, which motion varies in accordance with the magnitude of a variable.

As is well known one of the difficulties encountered in using a seal for transmitting motion through a wall of a pressure chamber is that the seal places a torque load on the member transmitting the rotary motion which is in opposition to the desired output motion. This torque load is quite pronounced in torque tube seals. In order to minimize this torque load it has been found desirable to use a flexible bellows in place of such devices as torque tubes. Such a substitution, however, is not feasible in that additional load effects may be created by the pressure condition acting on the sealing bellows. The present invention suggests a way of eliminating the oppositional load effects caused by the pressure in a vessel acting on the inside surface of the sealing bellows, by providing a compensating bellows having this same pressure applied to its outer surface.

It is accordingly another object of this present invention to overcome the pressure loading effects of a flexible sealing bellows by the addition of compensating bellows.

More specifically the present invention is devised and well suited as a pressure compensated seal between the wall of a pressure chamber and a pivotally mounted displacer arm such as the chamber and arm shown in the R. C. Whitehead et al. Patent No. 2,625,820, issued January 20, 1953.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Fig. 1 is a sectional plan view illustrating a preferred embodiment of the pressure compensated seal that can be used, e. g., with a displacement type of liquid level transmitting device;

Fig. 2 shows a sectional side view of the bellows in the upper right portion of Fig. 1, in its normal position, in solid line, and in a displaced position, in dotted line, the displaced position representing the position of the bellows when the displacer and the pressure chamber end of the displacer arm attached thereto has been moved in a downward direction; and Fig. 3 shows a sectional side view of the bellows, in the upper left portion of Fig. 1 in its normal position, in solid line, and in a displaced position, in dotted line, the displaced position representing the position of the bellows when the displacer and the pressure chamber end of the displacer arm attached thereto has been moved in a downward direction.

The selected form of the invention as illustrated in Fig. 1 shows the pressure compensated seal described supra being made use of in a typical displacement type transmitting device for measuring liquid level. In the apparatus shown, it is desired to determine the liquid level of a liquid in a tank 10. To accomplish this, the upper portion of the tank 10 is connected by means of a conduit 11 to the upper end of an eclosed pressure vessel 12, for convenience shown cut away at its upper portion in the drawing, and the lower end of the tank connected to the lower end of this same vessel by means of conduit 13. With this arrangement the level of liquid 14 in the vessel is always at the same level as that present in the tank. As the liquid level in the vessel is lowered by the same amount as the tank, less liquid will be displaced by the displacer 15 and the apparent weight of the displacer is increased due to decrease in the buoyant force of the liquid. Thus the displacer and displacer arm 16 attached thereto is moved in a downward direction a distance proportional to the drop in level of the liquid in the tank 1. Upward movement of the displacer and arm structure will similarly be realized when the liquid level of the fluid in the tank and vessel is increased to a higher level. This up and down motion in turn is transmitted by the displacer arm through a sealed opening 17. In order that this vertical motion can be turned into arcuate motion the outer end of the displacer arm is provided with two spaced pivots 18, 19 of the cross spring type. The outer end of this arm may be provided with a zeroing device, not shown, on the protuberance 34 if a counterbalancing means, for the displacer in the pressure chamber, is desired. As illustrated, one end of each of the springs forming pivot 18 is rigidly attached to the leg portion 21. The other end of each of said springs is rigidly attached to a member 23' which preferably forms a part of the wall 23. The springs forming the cross spring pivot 19 similarly join leg 22 and a member corresponding to the member 23' but located on the opposite side of wall 23 and not visible on the drawing.

The arcuate movement of the outer leg portions 21, 22 of the displacer arm 16 is used to regulate the outer pressure of a pneumatic transmitting apparatus, not shown.

The chief advantage of the sealing means shown in Fig. 1 over other seals used for this purpose is that it will not place a pressure load on the displacer arm 16 as the arm transmits arcuate motion through a sealed wall, e. g., the sealed wall 23. The sealed wall 23 shown in this figure may be attached by any conventional means, such as by the bolts 29 to the vessel 12.

The pressure seal disclosed in this application comprises a pair of bellows 24 and 25. One of the primary functions which these bellows perform is to seal the atmosphere within the vessel 12 from the outside and to provide a means for transmitting the motion of the arm 16 through the wall 23.

The bellows 25 is attached at its outer end to an extended portion 28 of the displacer arm 16 and at its inner end to a protruding portion 20 of the chamber wall 23. This bellows 25 is open to the pressure chamber 14 by means of aperture 17 in the chamber wall 23 so that the pressure in the chamber 12 will also be realized by the internal wall of this bellows 25.

As the liquid level in the vessel is lowered the displacer 15 and the right end of displacer arm 16 is similarly moved in a downward direction. During this downward movement the displacer arm 16, its extended portions 28, 33 and the leg portions 21, 22 are arcuately displaced about the pivots 18, 19 in a clockwise direction. As this downward motion takes place the outer end of the bellows 25 will be moved in an upward direction by the extended portion 28 of the displacer arm 16. Movement of the bellows in this manner will change the contour of the outer surface of this bellows 25 from its solid line position shown in Fig. 2 to its dotted line position shown in that same figure. Such bellows flexing diminishes the surface area of the upper portion of the bellows 25 that is exposed to vessel pressure on one side and atmospheric pressure on the other. As this latter mentioned change takes place a corresponding increase in surface area of the lower portion of the bellows 25 will also occur.

When the bellows 25 is in the central or solid line position shown in Fig. 2 the vessel pressure acting on the inside wall of the bellows is allowed to act uniformly on all portions of the inside wall. When, however, this bellows 25 is moved to the dotted line position by the displacer arm 16 this same vessel pressure will not tend to act uniformly on the inside wall of the vessel as it did when in the solid line position since the wall area on which this pressure is allowed to act has been altered as noted supra. Since the lower surface area of bellows 25 shown in the flexed or dotted line position has been increased and the upper surface decreased the net resultant force of the vessel pressure acting on the inside of the bellows 25 will therefore be in a downward direction. This downward force of the bellows thus produces a moment which tends to deter movement of the displaced arm 16 when the arm is moved in a clockwise direction about pivots 18, 19.

When the bellows 25 is forced in a downward direction away from its central or solid line position, during movement of the arm 16 in a counterclockwise direction about pivots 18, 19, a resultant retarding force will be applied to the arm 16 in a manner similar to but in the opposite direction of that already referred to supra.

To cancel out these retarding pressure forces a second or compensating bellows 24 is employed, which possesses similar design characteristics to the sealing bellows 25 shown in Fig. 2. One end of this bellows 24 is fixedly attached to a protuberance 30 on a hollow embossed portion 31 of the wall 23. The other or inner end of the bellows is attached to a disc 32 fixedly mounted on an extended leg portion 33 of the displacer arm 16. The center of the protuberance 30 at the outer end of this bellows 24 has an aperture 35 therein which connects the pressure chamber formed by the inner wall of the bellows 24 and the disc 32 to atmosphere. The embossed portion 31 is of sufficient internal area so as not to interfere with the free movement of the external surface of the bellows 24 during arcuate movement of the displacer arm about pivots 18 and 19.

As the extended portion 28 of displacer arm 16 moves the outer end of bellows 25 in an upward direction another extended leg portion 33 of the arm 16 is used to move the inner end disc 32 of a compensating bellows 24 in a downward direction from the solid to dotted line position shown in Fig. 3. During movement of this compensating bellows to its dotted line position the surface area of the lower portion of the bellows 24, exposed to vessel pressure on its outside and atmosphere on its inside, will be diminished.

As this latter mentioned change takes place a related increase in surface area of the upper portion of the corresponding bellows 24 will occur as indicated by the dotted line position in Fig. 3.

When the bellows 24 is in the central or solid line position shown in Fig. 2 the vessel pressure acting on the outside wall 23 of the vessel 12 is allowed to act uniformly on all portions of the outside wall. When, however, the bellows are moved to the dotted line position as noted supra by the displacer arm 16 this same vessel pressure will not tend to act uniformly on the outside wall of the bellows 24 as it did when the bellows was in the solid line position since the wall area on which this pressure has now been allowed to act has been altered as already explained.

Since the upper surface area of the compensating bellows 24 shown in the flexed or dotted line position has been increased and the lower surface decreased the net resultant force of the vessel pressure acting on the outside of the bellows 24 will therefore be in a downward direction. This downward resultant pressure force of the bellows 24 produces a moment which tends to assist the displacer 15 in moving the displacer arm 16 in a clockwise direction about pivots 18, 19. When the bellows 24 is forced in an upward direction away from its solid line position by the arcuate movement of the arm in a counterclockwise direction about pivots 18, 19 a resultant retarding force on the arm will be applied to the rod in a manner similar to but in the opposite direction of that already referred to supra.

It can thus be seen that the compensating bellows provides a means which will overcome the pressure loading effects of a flexible sealing bellows regardless of whether the latter bellows has been deflected downwardly or upwardly from its central or solid line position.

It can further be seen that the pressure compensating sealing means 24, 25 disclosed in this application will further not deter the movement of the displacer arm 16 should a change of pressure occur in chamber 12. This increased pressure acting on the inside of one bellows is neutralized by this same pressure acting on the outside of the other.

It can thus be realized that this invention provides a novel pressure compensating means for nullifying any detrimental pressure forces which a pressure seal may transmit to a rod transmitting an arcuate motion therethrough. The pressure compensated seal disclosed in this application therefore effects a more efficient means of transmitting minute degrees of motion through a seal than is afforded by commercially available seals used for this purpose.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention what I claim as new and desire to secure by Letters Patent is as follows:

1. A pressure compensated seal for transmitting angular motion through a pressure vessel wall comprising, a pair of matched sealing bellows, one of which has a variable vessel pressure on the inside thereof, the other of which has the said variable vessel pressure on the outside thereof, and a pivoted mechanical connection extending through said vessel wall and sealed by one of said bellows and having the other bellows connected for movement therewith so that, when said bellows are both angularly displaced by said connection from their longitudinal axes and said vessel pressure is changed, the resultant vessel pressure forces acting in said bellows on said connection nullify one another.

2. Means for transmitting mechanical motion through a fluid tight wall comprising, a motion transmitting member pivotally mounted and extending through an opening in said wall, a flexible means sealing off the area between the periphery of said wall opening and an outwardly projecting portion of said member, and a second flexible means having one end fixedly mounted on the inner side of said wall and its other end fixedly mounted to the inner end of said member, said first and second flexible means being so arranged that the resultant pressure force acting on one will be neutralized by the resultant pressure force acting on the other when said member is angularly displaced with respect to said wall.

3. A pressure compensating seal comprising two juxtapositioned bellows, one of said bellows being fixedly mounted on the inner wall of a pressure vessel at one end and to a means for transmitting arcuate motion at its other end, an aperture in said wall, said other bellows having one end fixedly attached to the wall area surrounding the aperture and its other end to said motion transmitting means, and a pair of spaced pivots fixedly positioned at equal distances away from the exterior of said wall, a portion of the transmitting means rotatably mounted for arcuate movement on said pivots, said pivots and bellows being so arranged that any increase or decrease in the pressure inside the vessel will flex the bellows in such a manner that the resultant pressure force acting on one will be neutralized by the equal and opposite pressure force acting on the other during arcuate motion of said transmitting means.

4. A pressure compensated flexible seal for transmitting arcuate motion through a pressure vessel wall independent of the pressure in the vessel comprising, an identical pair of flexible bellows, a pivoted mechanical connection extending through an aperture in said wall, one of said bellows having an open end attached to the wall surrounding said aperture and a closed end attached to said connection, and a compensating bellows inside said pressure vessel having one end fixedly attached to said wall and its other end to said connection, said pivoted connection and bellows being so arranged that any change occurring in the resultant vessel pressure forces acting on the interior of the open ended bellows during movement of said connection which tends to retard transmission of arm motion through said bellows will be nullified by the resultant pressure forces acting on the exterior of said compensating bellows.

5. A means of cancelling out the effect of a pressure change acting on the interior of a displacer arm sealing bellows during movement of said arm comprising, a sealing bellows mounted at one end on a displacer arm and fixedly attached and open to a pressure chamber at its opposite end, a compensating bellows positioned adjacent said sealing bellows, said compensating bellows having one end fixedly mounted on the interior of said pressure chamber and its other end attached to a portion of said displacer arm and movable therewith, and a fixed pivot means spaced away from the exterior of said chamber about which displacer arm motion is transmitted to the movable end of each of said bellows, said pivot means being so spaced away from said chamber that arcuate rotation of said arm elongates the upper surface of said compensating bellows as the corresponding upper surface of a sealing bellows is compressed, said bellows force due to elongation of said compensation bellows nullifies the force due to said sealing bellows during changes in vessel pressure.

6. A means of cancelling out the effect of a pressure change acting on the interior of a displacer arm sealing bellows during movement of said arm comprising, a sealing bellows mounted at one end on a displacer arm and fixedly attached and opened to a pressure chamber at its opposite end, a compensating bellows positioned adjacent said sealing bellows, said compensating bellows having one end fixedly mounted on the interior of said pressure chamber and its other end attached to a portion of said displacer arm and movable therewith, and a fixed pivot means spaced outwardly from a portion of the exterior of said chamber adjacent said bellows, said arm having an external portion attached to and mounted for arcuate movement on said pivot, said pivot being so located at a position exterior of said chamber that arcuate rotation of the arm compresses the lower surface of said compensating bellows and elongates the corresponding lower surface of the sealing bellows, said bellows force due to compression of said compensating bellows nullifying the force due to said sealing bellows during changes in vessel pressure.

7. A pressure compensated seal for transmitting angular motion through a pressure vessel wall comprising, a sealing bellows having the vessel pressure on the inside, a compensating bellows having the vessel pressure on the outside thereof, and a pivoted mechanical connection having an end portion attached to said compensating bellows and a portion extending through said vessel wall sealed by said sealing bellows, said bellows being so arranged that when said bellows are angularly displaced by said connection from their longitudinal axes the resultant vessel pressure forces acting in each of said bellows on said connection nullify each other.

8. A pressure compensating seal comprising two juxtapositioned bellows, one of said bellows being fixedly mounted on the inner wall of a pressure vessel at one end and to a means for transmitting arcuate motion at its other end, an aperture in said wall, said other bellows having one end fixedly attached to the wall area surrounding the aperture and its other end to said motion transmitting means, a pair of spaced pivots fixedly positioned at equal distances away from the exterior of said wall, a U-shaped extension having its base connected to and extending from the portion of said motion transmitting means attached to said other bellows and having its legs attached to said pivots for arcuate movement thereon, said pivots and bellows being so arranged that any increase or decrease in the pressure inside the vessel will flex the bellows in such a manner that the resultant pressure force acting on one will be neutrailzed by the equal and opposite pressure force acting on the other during arcuate motion of said transmitting means.

9. A means of cancelling out the effect of a pressure change acting on the interior of a displacer arm sealing bellows during movement of said arm comprising, a portion of said arm passing therethrough and attached at its outer end to said sealing bellows, said sealing bellows having its other end fixedly attached and open to a pressure chamber, a compensating bellows positioned adjacent said sealing bellows, said compensating bellows having one end fixedly mounted on the interior of said pressure chamber and its other end attached to a portion of said displacer arm and movable therewith, two spaced pivots each fixedly positioned at equal distances away from the exterior of said chamber, said pivots acting as a means external of and parallel to said longitudinal axes of said sealing bellows about which displacer arm motion is transmitted to the movable end of each of said bellows, said pivot being so located on said longitudinal axes that arcuate movement of said arm elongates the upper surface of said compensating bellows as the corresponding upper surface of the sealing bellows is compressed, said bellows force due to elongation of said compression bellows nullifying the force due to said sealing bellows during changes in vessel pressure.

10. A pressure compensated seal for transmitting an arcuate motion of a mechanical connection through a pressure wall comprising, a pair of identical sealing bellows having their longitudinal axes normally perpendicular to said wall, a first of said bellows having a vessel pressure acting on its internal surface and the other on its external surface, a pair of spaced pivots fixedly positioned at equal distances away from the interior of said wall, said mechanical connection extending through the vessel wall and the interior of said first bellows and flexibly attached for arcuate movement to said pivots, said first bellows having a free end attached to said mechanical connection and its other end fixedly attached to an exterior portion of said wall, said other bellows having one end fixedly connected to a portion of said pressure wall and a free end connected for arcuate movement with said connection, an aperture in said wall for connecting the pressure in said other bellows to atmosphere, said pivots being so spaced from said wall that the result pressure force acting on said first bellows will be nullified by the pressure force acting on said other bellows when said connection is arcuately moved with respect to said wall.

References Cited in the file of this patent
UNITED STATES PATENTS

| | | |
|---|---|---|
| 2,460,503 | Howe | Feb. 1, 1949 |
| 2,633,022 | Rosenberger | Mar. 31, 1953 |